US011716556B2

(12) United States Patent
Takashino et al.

(10) Patent No.: US 11,716,556 B2
(45) Date of Patent: Aug. 1, 2023

(54) INFORMATION MANAGEMENT SYSTEM, INFORMATION MANAGEMENT METHOD, AND NON-TRANSITORY COMPUTER-READABLE MEDIUM STORING INFORMATION MANAGEMENT PROGRAM

(71) Applicant: TOYOTA JiDOSHA KABUSHIKI KAISHA, Toyota (JP)

(72) Inventors: Hiroaki Takashino, Saitama (JP); Hikaru Sugata, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 17/591,985

(22) Filed: Feb. 3, 2022

(65) Prior Publication Data

US 2022/0256256 A1 Aug. 11, 2022

(30) Foreign Application Priority Data

Feb. 10, 2021 (JP) .................................. 2021-020197

(51) Int. Cl.
*H04Q 9/00* (2006.01)
*H04B 7/155* (2006.01)
(Continued)

(52) U.S. Cl.
CPC ............... *H04Q 9/00* (2013.01); *H04B 7/155* (2013.01); *H04Q 2209/40* (2013.01)

(58) Field of Classification Search
None
See application file for complete search history.

(56) References Cited

U.S. PATENT DOCUMENTS

2015/0256968 A1 9/2015 Terazaki et al.

FOREIGN PATENT DOCUMENTS

| CN | 103270751 A | * | 8/2013 | ......... H04L 12/1818 |
| CN | 105191231 A | * | 12/2015 | ............. H04L 12/18 |

(Continued)

OTHER PUBLICATIONS

JP-2018019169-A English Language Translation (Year: 2018).*

(Continued)

*Primary Examiner* — Curtis A Kuntz
*Assistant Examiner* — Jerold B Murphy
(74) *Attorney, Agent, or Firm* — Dinsmore & Shohl LLP

(57) ABSTRACT

An information management system which reduces the possibility of degradation of information management efficiency, an information management method, and an information management program are provided. In an information management system which includes a plurality of terminal devices to configured to generate detection data, a plurality of repeaters configured to acquire the detection data from at least one of the plurality of terminal devices, and a server configured to give and receive data to and from at least one of the plurality of repeaters, the plurality of repeaters respectively receive the detection data in advance from at least one of the plurality of terminal devices, the plurality of repeaters respectively hold terminal device lists, and the terminal device lists indicate at least one of the plurality of terminal devices from which the detection data is received and latest receipt time which is time at which the detection data is received.

10 Claims, 7 Drawing Sheets

(51) Int. Cl.
*H04L 41/0873* (2022.01)
*H04L 41/0896* (2022.01)

(56) References Cited

FOREIGN PATENT DOCUMENTS

| | | | | | |
|---|---|---|---|---|---|
| CN | 104253970 | B | * | 2/2018 | ......... H04L 41/0886 |
| CN | 106161868 | B | * | 3/2019 | ......... H04N 1/00244 |
| JP | 2015-170937 | A | | 9/2015 | |
| JP | 2018019169 | A | * | 2/2018 | |

OTHER PUBLICATIONS

CN—106161868-B English Language Translation (Year: 2019).*
CN-104253970-B English Language Translation (Year: 2018).*
CN-103270751-A English Language Translation (Year: 2013).*
CN-105191231-A English Language Translation (Year: 2015).*

* cited by examiner

INFORMATION MANAGEMENT SYSTEM, INFORMATION MANAGEMENT METHOD, AND NON-TRANSITORY COMPUTER-READABLE MEDIUM STORING INFORMATION MANAGEMENT PROGRAM

CROSS REFERENCE TO RELATED APPLICATIONS

This application is based upon and claims the benefit of priority from Japanese patent application No. 2021-020197, filed on Feb. 10, 2021, the disclosure of which is incorporated herein in its entirety by reference.

BACKGROUND

The present disclosure relates to an information management system, an information management method, and an information management program, and more particularly, to an information management system including a plurality of terminal devices, a plurality of repeaters and a server, an information management method, and an information management program.

Japanese Unexamined Patent Application Publication No. 2015-170937 discloses an example of such an information management system. The information management system disclosed in Japanese Unexamined Patent Application Publication No. 2015-170937 includes a plurality of peripherals and a plurality of centrals. The centrals acquire detection data from at least one of the plurality of peripherals. In a case where the information management system disclosed in Japanese Unexamined Patent Application Publication No. 2015-170937 includes a server, at least one of the plurality of centrals gives and receives information to and from the server.

SUMMARY

The present inventors, or the like, have found the following problems.

In such an information management system, there is a case where a certain repeater acquires detection data again from a terminal device from which another repeater has already acquired the detection data depending on arrangement relationship of a plurality of terminal devices and a plurality of repeaters. This causes repetition of communication connection and communication disconnection, which may degrade information management efficiency as the whole information management system.

The present disclosure provides an information management system which reduces the possibility of degradation of information management efficiency, an information management method, and an information management program.

An information management system according to one aspect of the present disclosure is an information management system including a plurality of terminal devices configured to generate detection data, a plurality of repeaters configured to acquire the detection data from at least one of the plurality of terminal devices, and a server configured to give and receive data to and from at least one of the plurality of repeaters, the plurality of repeaters respectively receiving detection data in advance from at least one of the plurality of terminal devices, the plurality of repeaters respectively holding terminal device lists, the terminal device lists indicating at least one of the plurality of terminal devices from which the detection data is received in advance and latest receipt time which is time at which the detection data is received in advance, the plurality of repeaters being notified of latest receipt time at which one of the plurality of repeaters receives the detection data from one of the plurality of terminal devices, via the server, and the plurality of repeaters determining whether or not to acquire detection data from at least one of the plurality of terminal devices from which the detection data is received in advance, in the terminal device lists based on the notified latest receipt time.

According to such a configuration, it is possible to avoid the plurality of repeaters from acquiring detection data again from a terminal device from which the detection data has already been acquired based on the latest receipt time which is a time point at which one of the plurality of repeaters has received the detection data from one of the plurality of terminal devices. Further, the plurality of repeaters can select a terminal device from which one of the plurality of repeaters has not received the detection data and can acquire the detection data from the selected terminal device. This can prevent repetition of communication connection and communication disconnection as a result of a certain repeater performing communication connection again with a terminal device from which the detection data has already been acquired by another repeater in the whole information management system. It is therefore possible to reduce the possibility of degradation of information management efficiency of the whole information management system.

An information management method according to one aspect of the present disclosure is an information management method to be executed in an information management system including a plurality of terminal devices configured to generate detection data, a plurality of repeaters configured to acquire the detection data from at least one of the plurality of terminal devices, and a server configured to give and receive data to and from at least one of the plurality of repeaters, the plurality of repeaters receiving detection data in advance from at least one of the plurality of terminal devices, the plurality of repeaters respectively holding terminal device lists, and the terminal device lists indicating at least one of the plurality of terminal devices from which the detection data is received in advance and latest receipt time which is time at which the detection data is received in advance, the information management method including a step of notifying all of the plurality of repeaters of latest receipt time at which one of the plurality of repeaters receives the detection data from one of the plurality of terminal devices, via the server, and a step of determining whether or not to acquire detection data from one of the plurality of terminal devices in the terminal device lists based on the notified latest receipt time.

An information management program according to one aspect of the present disclosure is a program for causing a computer which operates as one of a plurality of repeaters in an information management system to execute steps, the information management system including a plurality of terminal devices configured to generate detection data, a plurality of repeaters configured to acquire the detection data from at least one of the plurality of terminal devices, and a server configured to give and receive data to and from at least one of the plurality of repeaters, the plurality of repeaters receiving detection data in advance from at least one of the plurality of terminal devices, the plurality of repeaters respectively holding terminal device lists, and the terminal device lists indicating at least one of the plurality of terminal devices from which the detection data is received in advance and latest receipt time which is time at which the detection data is received in advance, the steps including a step of notifying all of the plurality of repeaters of latest receipt time which is time at which one of the plurality of repeaters receives the detection data from one of the plurality of terminal devices, via the server, and a step of determining whether or not to acquire detection data from one of the plurality of terminal devices in the terminal device lists based on the notified latest receipt time.

The present disclosure can provide an information management system which reduces the possibility of degradation of information management efficiency, an information management method, and an information management program.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied will be described in detail below with reference to the drawings. However, the present disclosure is not limited to the following embodiments. Further, to clarify explanation, the following description and drawings are simplified as appropriate.

(First embodiment)

A first embodiment will be described below with reference to the drawings.

Figure 1:
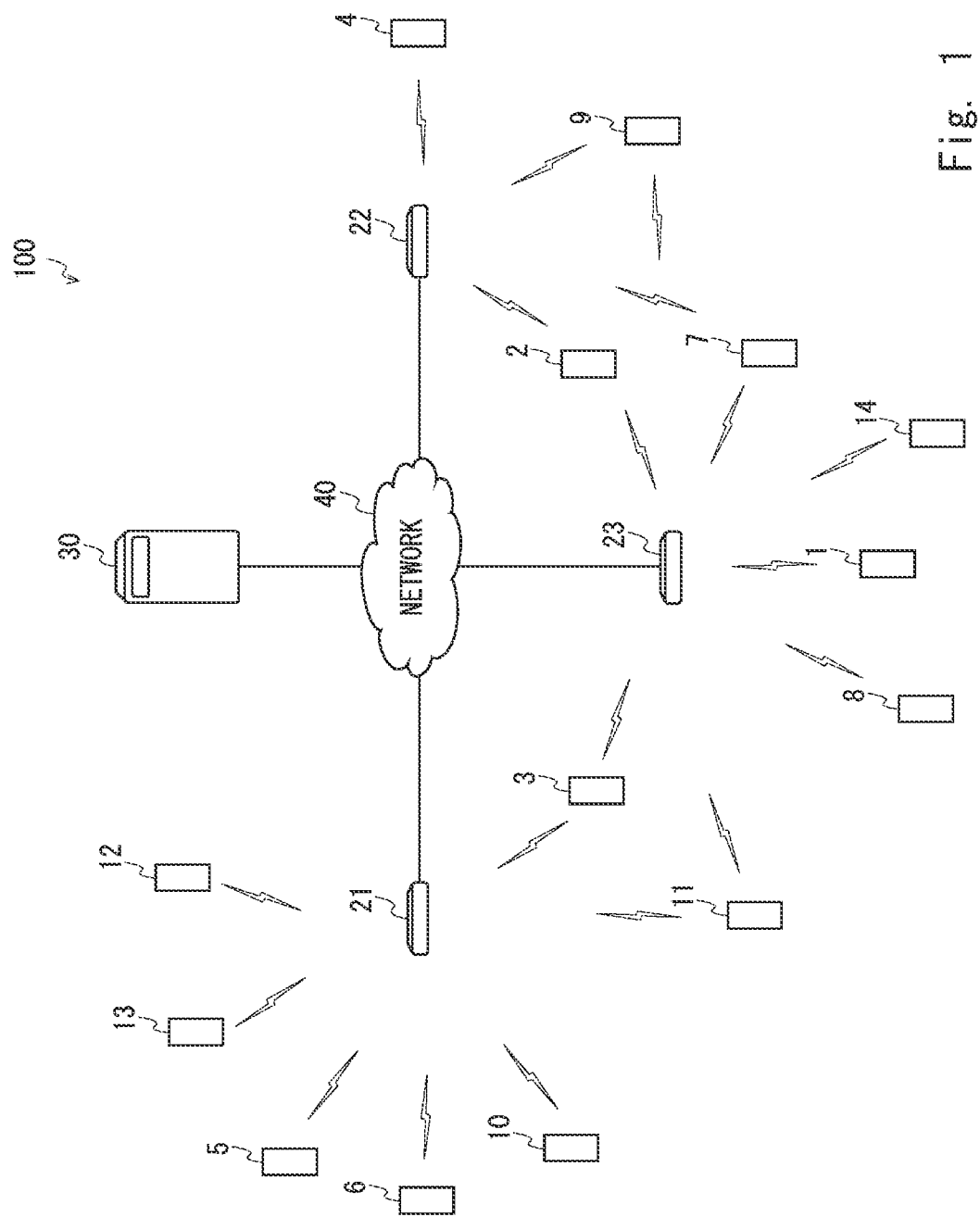
FIG. 1 is a view illustrating an example of an information management system according to a first embodiment.

FIG. 1 is a view illustrating an example of an information management system according to the first embodiment.

As illustrated in FIG. 1, an information management system 100 includes terminal devices 1 to 14, repeaters 21 to 23, and a server 30. The terminal devices 1 to 14 and the repeaters 21 to 23 can perform data communication with each other through wireless communication which complies with various wireless communication standards such as, for example, Bluetooth (registered trademark) low energy (BLE). The repeaters 21 to 23 and the server 30 can perform data communication with each other via a network 40 including at least one of a local area network (LAN) or a wide area network (WAN).

Note that while FIG. 1 illustrates a configuration where the repeaters 21 to 23 and the server 30 perform data communication in a wired manner, the repeaters 21 to 23 and the server 30 may perform data communication with each other through wireless communication. Further, while the information management system 100 illustrated in FIG. 1 includes three repeaters, the number of repeaters which can be included in the information management system 100 is not limited to three and only requires to be more than one. Further, while the information management system 100 illustrated in FIG. 1 includes 14 terminal devices, the number of terminal devices which can be included in the information management system 100 is not limited to 14 and only requires to be more than one.

The terminal devices 1 to 14 are devices which generate and provide detection data. Specific examples of the terminal devices 1 to 14 can include portable terminal devices such as wearable terminals, terminal devices which can autonomously move, or the like. Microphones and acceleration sensors can be provided at the terminal devices 1 to 14. The detection data to be generated by the terminal devices 1 to 14 includes sound around the terminal devices recorded by the microphones of the terminal devices 1 to 14 and acceleration applied to the acceleration sensors of the terminal devices 1 to 14. The terminal devices 1 to 14 store the generated detection data in storage devices provided at the own devices.

The terminal devices 1 to 14 respectively regularly transmit identification information of the own devices. For example, the terminal devices 1 to 14 can transmit advertising packets including the identification information of the own devices. In the present embodiment, various kinds of identification information such as MAC addresses and serial numbers of the terminal devices can be employed as the identification information of the terminal devices 1 to 14. A time interval at which the terminal devices 1 to 14 transmit the identification information of the own devices can be set at, for example, 300 milliseconds, or the like. The identification information transmitted by the terminal devices 1 to 14 is received by repeaters which can perform communication with the terminal devices.

Further, the terminal devices 1 to 14 provide the detection data stored in the storage devices of the respective terminal devices to repeaters which have transmitted requests in accordance with the requests from the repeaters 21 to 23.

The terminal devices 1 to 14 delete the detection data from the storage devices after providing the detection data to the repeaters.

Figure 2:
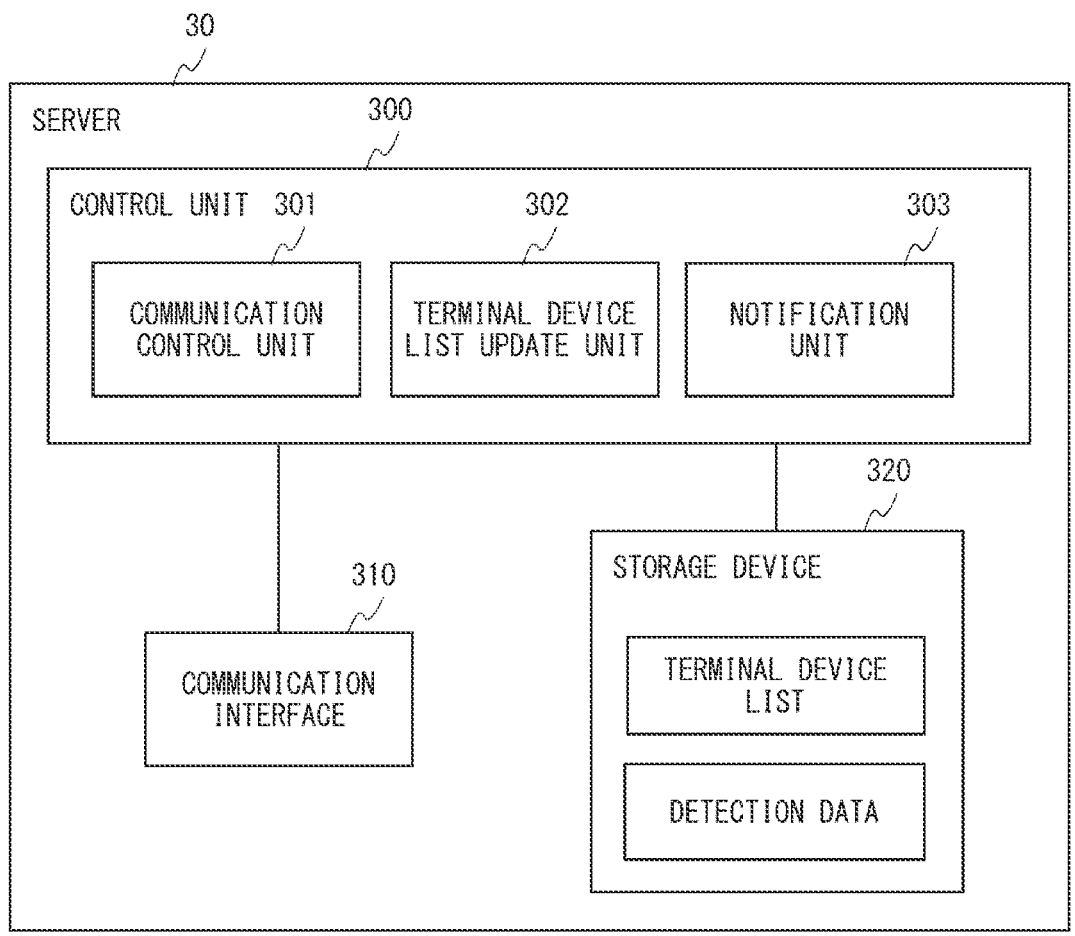
FIG. 2 is a block diagram illustrating a configuration of a management terminal of the information management system according to the first embodiment.

FIG. 2 is a block diagram illustrating a configuration of the server 30 according to the first embodiment. The server 30 is an information processing device which acquires the detection data generated by the terminal devices 1 to 14 via the repeaters 21 to 23. The server 30 includes a control unit 300, a communication interface 310, and a storage device 320.

The control unit 300 is an arithmetic device such as a central processing unit (CPU) and a micro processing unit (MPU) which controls electronic circuits and devices provided at the server 30. The control unit 300 reads out a program from the storage device 320 and executes the program. The program includes a communication control unit 301, a terminal device list update unit 302 and a notification unit 303.

The communication control unit 301 is a program module which controls communication between the server 30 and the repeaters 21 to 23. The communication control unit 301 receives the detection data of the terminal devices 1 to 14 from the repeaters 21 to 23 and stores the detection data in the storage device 320. Note that the communication control unit 301 may store the detection data in a data server which can be accessed by the server 30 via the network 40.

Further, the communication control unit 301 receives information including identification information of terminal devices with which the repeaters can perform communication, the detection data and latest receipt time from the repeaters 21 to 23. The communication control unit 301 provides the received information to the terminal device list update unit 302.

The terminal device list update unit 302 is a program for updating a terminal device list. The identification information of the terminal devices 1 to 14, the detection data and the latest receipt time are registered in the terminal device list in association with one another. The identification information of the terminal devices 1 to 14, the detection data and the latest receipt time are registered in the terminal device list such that each set of the identification information of the terminal devices 1 to 14, the detection data and the latest receipt time is associated for each column on a one-to-one basis.

The latest receipt time is latest time at which respective pieces of detection data of the terminal devices 1 to 14 are received at the respective repeaters 21, 22 and 23. When the communication control unit 301 receives the above-described information, the terminal device list update unit 302 updates the latest receipt time associated with identification information of a terminal device which has generated the detection data.

In the present embodiment, various kinds of identification information such as MAC addresses and serial numbers of the repeaters 21 to 22 can be employed as the identification information of the repeaters 21 to 22. Connection order of the terminal devices 1 to 14 is order in which the repeaters 21 to 23 perform communication connection with the terminal devices which are connection targets.

The notification unit 303 is a program which notifies the repeaters 21 to 23 of the latest receipt time updated by the terminal device list update unit 302 via the communication interface 310.

The communication interface 310 is an interface which performs data communication with the repeaters 21 to 23. When the communication interface 310 receives various kinds of data from the repeaters 21 to 23, the communication interface 310 provides the data to the control unit 300.

Further, the communication interface 310 can transmit various kinds of data to the repeaters 21 to 23 under control by the control unit 300.

The storage device 320 is a storage device which stores the terminal device list and various kinds of data such as the detection data.

Figure 3:
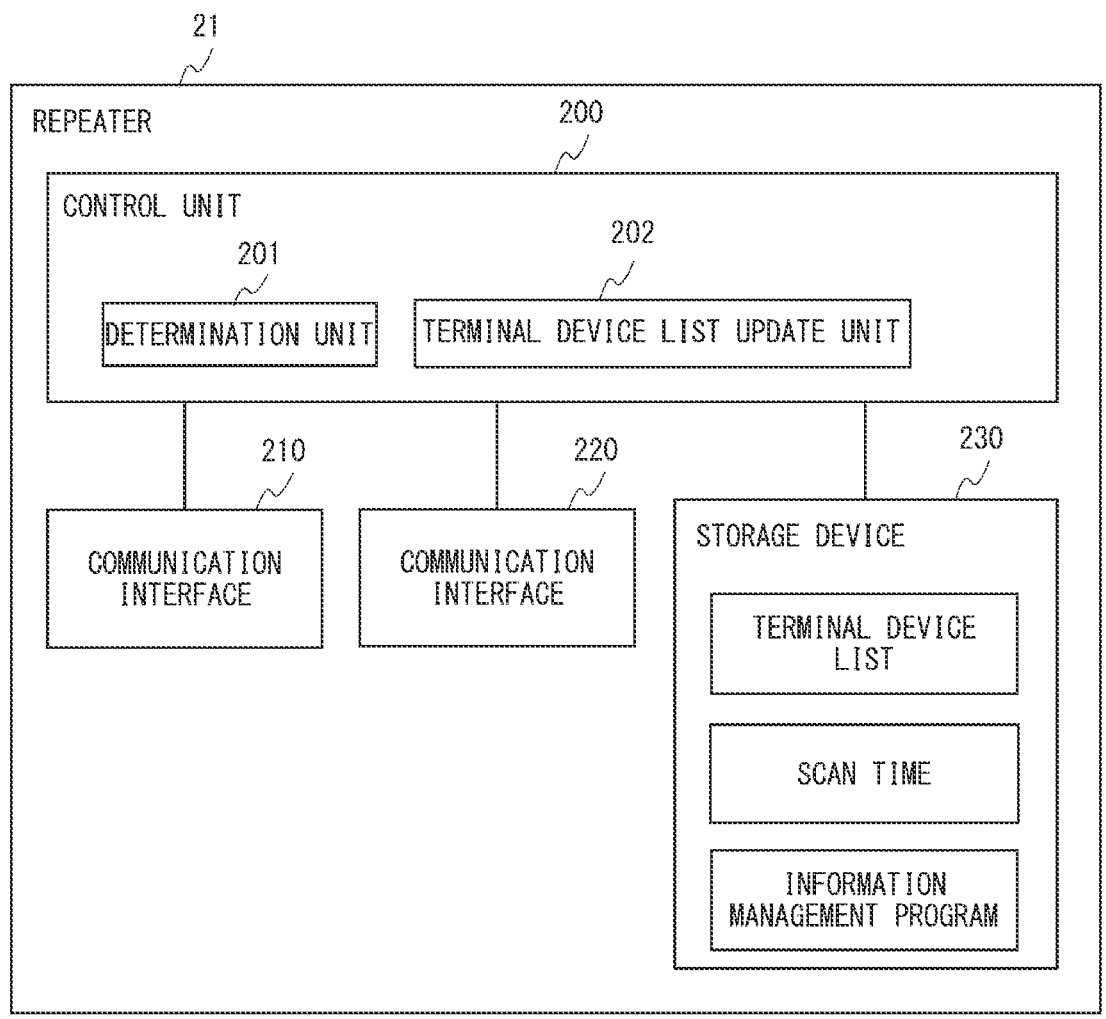
FIG. 3 is a block diagram illustrating a configuration of a repeater in the information management system according to the first embodiment.

FIG. 3 is a block diagram illustrating a configuration of the repeater 21 according to the first embodiment. The configuration of the repeater 21 will be described below with reference to FIG. 3. Note that the repeaters 22 and 23 have the same configuration as the configuration of the repeater 21.

The repeater 21 includes a control unit 200, a communication interface 210, a communication interface 220, and a storage device 230.

The control unit 200 is an arithmetic device such as a CPU and an MPU which controls electronic circuits and devices provided at the repeater 21. The control unit 200 regularly generates a terminal device list including identification information of terminal devices which can perform communication with the repeater 21 and transmits the terminal device list to the server 30. A time interval at which the control unit 200 generates and transmits the terminal device list can be set at, for example, 30 seconds, or the like.

Specifically, the control unit 200 scans terminal devices which can perform communication with the repeater 21. More specifically, the control unit 200 acquires identification information of terminal devices included in advertising packets transmitted by the terminal devices which can perform communication with the repeater 21. In this event, the control unit 200 may wait for advertising packets transmitted by the terminal devices 1 to 14 during a time interval (such as, for example, 300 milliseconds) at which the terminal devices 1 to 14 transmit the advertising packets and may generate the terminal device list based on the advertising packets received during this time interval. The control unit 200 generates the terminal device list including the identification information of the terminal devices which can perform communication with the repeater 21. Further, the control unit 200 may acquire latest receipt time of the terminal devices in the terminal device list from the server 30 and may generate the terminal device list based on the acquired latest receipt time. Further, the control unit 200 may measure scan time at which the terminal devices which can perform communication with the repeater 21 are scanned and may store the measured scan time in the storage device 230. Further, the control unit 200 may store all terminal devices which may be scanned and temporal latest receipt time associated with the terminal devices which may be scanned in the storage device 230 in advance and may generate the terminal device list by reading out scanned terminal devices and temporal latest receipt time associated with the scanned terminal devices from the storage device 230.

Further, the control unit 200 includes a determination unit 201 and a terminal device list update unit 202. The control unit 200 receives the latest receipt time updated by the terminal device list update unit 302 from the server 30. Further, the control unit 200 receives the identification information of the terminal devices 1 to 14 and the latest receipt time of the terminal devices 1 to 14 from the terminal devices 1 to 14. The terminal device list update unit 202 updates the terminal device list based on the latest receipt time received from the terminal devices 1 to 14 or the server 30.

The communication interface 210 is an interface which performs wireless data communication with the terminal devices 1 to 14. When the communication interface 210 receives various kinds of data from the terminal devices 1 to 14, the communication interface 210 provides the data to the control unit 200. Further, the communication interface 210 can transmit various kinds of data to the terminal devices 1 to 14 under control by the control unit 200.

The communication interface 220 is an interface which performs data communication with the server 30. When the communication interface 220 receives various kinds of data from the server 30, the communication interface 220 provides the data to the control unit 200. Further, the communication interface 220 can transmit various kinds of data to the server 30 under control by the control unit 200.

The storage device 230 is a storage device which stores various kinds of data such as the advertising packets received from the terminal devices 1 to 14, the terminal device list, the scan time and an information management program to be executed by the control unit 200. The determination unit 201 and the terminal device list update unit 202 function by the control unit 200 executing the information management program.

(Example of Processing)

Figure 4:
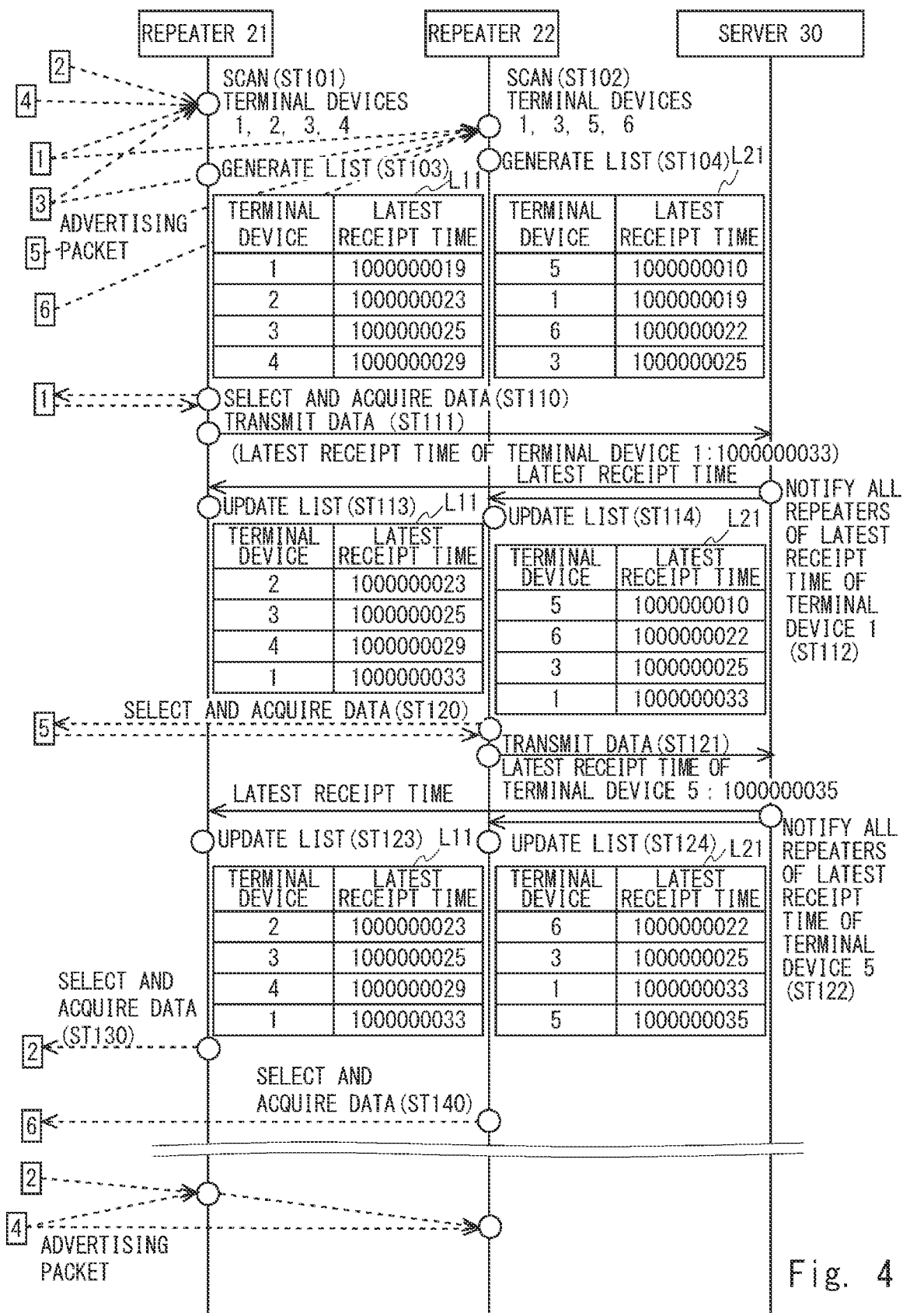
FIG. 4 is sequence illustrating an example of processing to be executed in the information management system according to the first embodiment.

An example of processing to be executed in the information management system 100 will be specifically described next with reference to FIG. 4. FIG. 4 is a view illustrating an example of sequence of the processing to be executed in the information management system 100.

The repeater 21 scans advertisements of the respective terminal devices (step ST101). Specifically, the repeater 21 receives advertising packets from the respective terminal devices and acquire terminal device IDs from the advertising packets. In the example illustrated in FIG. 4, the repeater 21 receives advertising packets from the terminal devices 1 to 4 and acquires terminal device IDs from the advertising packets.

Subsequently, the repeater 22 scans the advertisements of the respective terminal devices (step ST102). Specifically, the repeater 22 receives advertising packets from the respective terminal devices and acquires terminal device IDs from the advertising packets. In the example illustrated in FIG. 4, the repeater 22 receives advertising packets from the terminal devices 1, 3, 5 and 6 and acquires terminal device IDs from the advertising packets. Note that the processing in step ST101 and step ST102 may be performed in reverse order or may be performed substantially at the same time.

Subsequently, the repeater 21 generates a terminal device list L11 (step ST103). The terminal device list L11 may be generated by rearranging the terminal device IDs acquired by the repeater 21 in step ST101 in chronological order of the latest receipt time. In an example of the terminal device list L11 illustrated in FIG. 4, the terminal devices 1 to 4 are arranged in chronological order of the latest receipt time, that is, in order of the terminal devices 1, 2, 3 and 4 from the top to the bottom. The latest receipt time of the terminal devices 1 to 4 may be transmitted in advance from the server 30 to the repeater 21.

In a similar manner, the repeater 22 generates a terminal device list L21 (step ST104). The terminal device list L21 may be generated by rearranging the terminal device IDs acquired by the repeater 22 in step ST102 in chronological order of the latest receipt time. In an example of the terminal device list L21 illustrated in FIG. 4, the terminal devices 1, 3, 5 and 6 are arranged in chronological order of the latest receipt time, that is, in order of the terminal devices 5, 1, 6 and 3 from the top to the bottom in ascending order of the latest receipt time. The latest receipt time of the terminal devices 1, 3, 5 and 6 may be transmitted in advance from the server 30 to the repeater 22.

Subsequently, the repeater 21 selects one of the terminal devices 1 to 4 in the terminal device list L11 based on the latest receipt time and acquires detection data from the selected terminal device (step ST110). Specifically, the repeater 21 selects a terminal device with the oldest latest receipt time in the terminal device list L11. The repeater 21 performs communication connection with the selected terminal device and transmits a request for detection data to the connected terminal device. When the connected terminal device receives the request for detection data from the repeater 21, the connected terminal device transmits the detection data held by the connected terminal device to the repeater 21 and deletes the transmitted detection data. In an example illustrated in FIG. 4, the repeater 21 selects the terminal device 1 arranged at the top in the terminal device list L11. The repeater 21 performs communication connection with the terminal device 1 and acquires detection data from the terminal device 1.

Subsequently, the repeater 21 transmits the detection data, or the like, acquired in step ST110 to the server 30 (step ST111). Specifically, the repeater 21 transmits the detection data and the latest receipt time which is time at which the detection data is acquired to the server 30. Further, the repeater 21 transmits a request which requests the server 30 to notify all the repeaters 21 and 22 of the latest receipt time, to the server 30. In an example illustrated in FIG. 4, the repeater 21 transmits the detection data acquired from the terminal device 1 and latest receipt time 1000000033 of the terminal device 1 which is time at which the detection data is acquired, to the server 30.

Subsequently, the server 30 notifies all the repeaters of the latest receipt time of the terminal device transmitted in step ST111 (step ST112). It would be better for the server 30 to store the detection data and the latest receipt time which is time at which the detection data is acquired in the storage device 320. In an example illustrated in FIG. 4, the server 30 notifies the repeaters 21 and 22 of the latest receipt time 1000000033 of the terminal device 1.

Subsequently, all the repeaters respectively update the terminal device lists for each repeater (step ST113 and ST114). Specifically, all the repeaters update the latest receipt time of the terminal device in the terminal device lists to the latest receipt time notified in step ST112. Then, all the repeaters rearrange the terminal device IDs in chronological order of the latest receipt time in the terminal device lists for each repeater. The terminal device for which the latest receipt time is updated moves to the end of the row in the terminal device lists. In an example illustrated in FIG. 4, the repeaters 21 and 22 respectively update the terminal device lists L11 and L21 by replacing latest receipt time 1000000019 of the terminal device 1 with the latest receipt time 1000000033 of the terminal device 1 notified in step ST112. Then, the repeaters 21 and 22 respectively rearrange the terminal device IDs in chronological order of the latest receipt time in the terminal device lists L11 and L21. As a result, the latest receipt time 1000000033 of the terminal device 1 becomes the latest compared to the latest receipt time of other terminal devices in the terminal device lists L11 and L21. Thus, the terminal device 1 moves to the end of the row in the terminal device lists L11 and L21.

Subsequently, the repeater 22 selects one of the terminal devices 1, 3, 5 and 6 in the terminal device list L21 based on the latest receipt time and acquires detection data from the selected terminal device in a similar manner to step ST110

(step ST120). Specifically, the repeater 22 selects a terminal device with the oldest latest receipt time in the terminal device list L21. The repeater 22 performs communication connection with the selected terminal device and transmits a request for detection data to the connected terminal device. When the connected terminal device receives the request for detection data from the repeater 22, the connected terminal device transmits the detection data held by the connected terminal device to the repeater 22 and deletes the transmitted detection data.

In an example illustrated in FIG. 4, the repeater 22 selects the terminal device 5 arranged at the top in the terminal device list L21. The repeater 22 performs communication connection with the terminal device 5 and acquires detection data from the terminal device 5. Here, a terminal device with the oldest latest receipt time in the terminal device list L21 is the terminal device 5 at the top in the row of the terminal device list L21 and is not the terminal device 1 for which the latest receipt time is updated in step ST114. Thus, the repeater 22 connects to the terminal device 5 and acquires detection data from the terminal device 5 without connecting to the terminal device 1 with which the repeater 21 has performed communication connection and has acquired the detection data. The repeater 22 therefore does not connect to the terminal device 1 with which the repeater 21 has performed communication connection and has acquired the detection data.

Subsequently, the repeater 22 transmits the detection data, or the like, acquired in step ST120 to the server 30 in a similar manner to step ST111 (step ST121). In an example illustrated in FIG. 4, the repeater 22 transmits the detection data acquired from the terminal device 5 and latest receipt time 1000000035 of the terminal device 5 to the server 30.

Subsequently, the server 30 notifies all the repeaters of the latest receipt time of the terminal device transmitted in step ST121 in a similar manner to step ST112 (step ST122). In an example illustrated in FIG. 4, the server 30 notifies the repeaters 21 and 22 of the latest receipt time 1000000035 of the terminal device 5.

Subsequently, all the repeaters respectively update the terminal device lists in a similar manner to step ST113 and ST114 (step ST123 and ST124). Specifically, all the repeaters respectively update the latest receipt time of the terminal device in the terminal device lists to the latest receipt time of the terminal device notified in step ST122. Then, all the repeaters rearrange the terminal device IDs in the terminal device lists of the own repeaters in chronological order of the latest receipt time. In an example illustrated in FIG. 4, the repeater 22 updates the latest receipt time of the terminal device in the terminal device list L21 by replacing latest receipt time 1000000010 of the terminal device 5 with the latest receipt time 1000000035 of the terminal device 5 notified in step ST122. Then, the repeater 22 rearranges the terminal device IDs in the terminal device list L21 in chronological order of the latest receipt time. Note that while the repeater 21 also performs updating, or the like, described above in a similar manner, the latest receipt time of the terminal device 5 is not originally described in the terminal device list L11, and thus, there is no apparent change between before and after step ST123.

After the processing described above, processing similar to the processing from step ST110 to ST114 or from step ST120 to ST124 may be performed on a terminal device from which detection data has yet been acquired. After the processing in these steps is repeated and processing similar to the processing from step ST110 to ST114 or from step ST120 to ST124 is performed on terminal devices indicated in the end of the terminal device lists L11 and L21, the processing may return to step ST101 again.

Specifically, the repeater 21 selects one of the terminal devices 1 to 4 in the terminal device list L11 based on the latest receipt time and acquires detection data from the selected terminal device in a similar manner to step ST110 (step ST130). In an example illustrated in FIG. 4, the repeater 21 selects the terminal device 2 arranged at the top in the terminal device list L11. The repeater 21 performs communication connection with the terminal device 2 and acquires detection data from the terminal device 2. Further, the repeater 21 shares the acquired detection data by notifying all the repeaters via the server 30 in a similar manner to step ST111 to ST114.

Subsequently, the repeater 22 selects one of the terminal devices 1, 3, 5 and 6 in the terminal device list L21 based on the latest receipt time and acquires detection data from the selected terminal device in a similar manner to step ST120 (step ST140). In an example illustrated in FIG. 4, the repeater 22 selects the terminal device 6 arranged at the top in the terminal device list L11. The repeater 22 performs communication connection with the terminal device 6 and acquires the detection data from the terminal device 6. Further, the repeater 22 shares the acquired detection data by notifying all the repeaters via the server 30 in a similar manner to step ST121 to ST124.

Subsequently, processing similar to the processing from step ST110 to ST114 or from step ST120 to ST124 is performed on the terminal devices 3 and 4 from which detection data has yet been acquired. Neither the repeater 21 nor the repeater 22 acquires the detection data from the terminal device 3 in a similar manner to the terminal device 1. The other of the repeater 21 and the repeater 22 does not connect to the terminal device 3 from which the detection data has been acquired.

According to an example described above, it is possible to avoid both the repeaters 21 and 22 from performing communication connection and acquiring detection data from the terminal devices 1 and 3 which are respectively scanned by the repeaters 21 and 22. It is therefore possible to reduce the possibility of degradation of information management efficiency as the whole information management system 100.

(Example of Processing)

Figure 5:
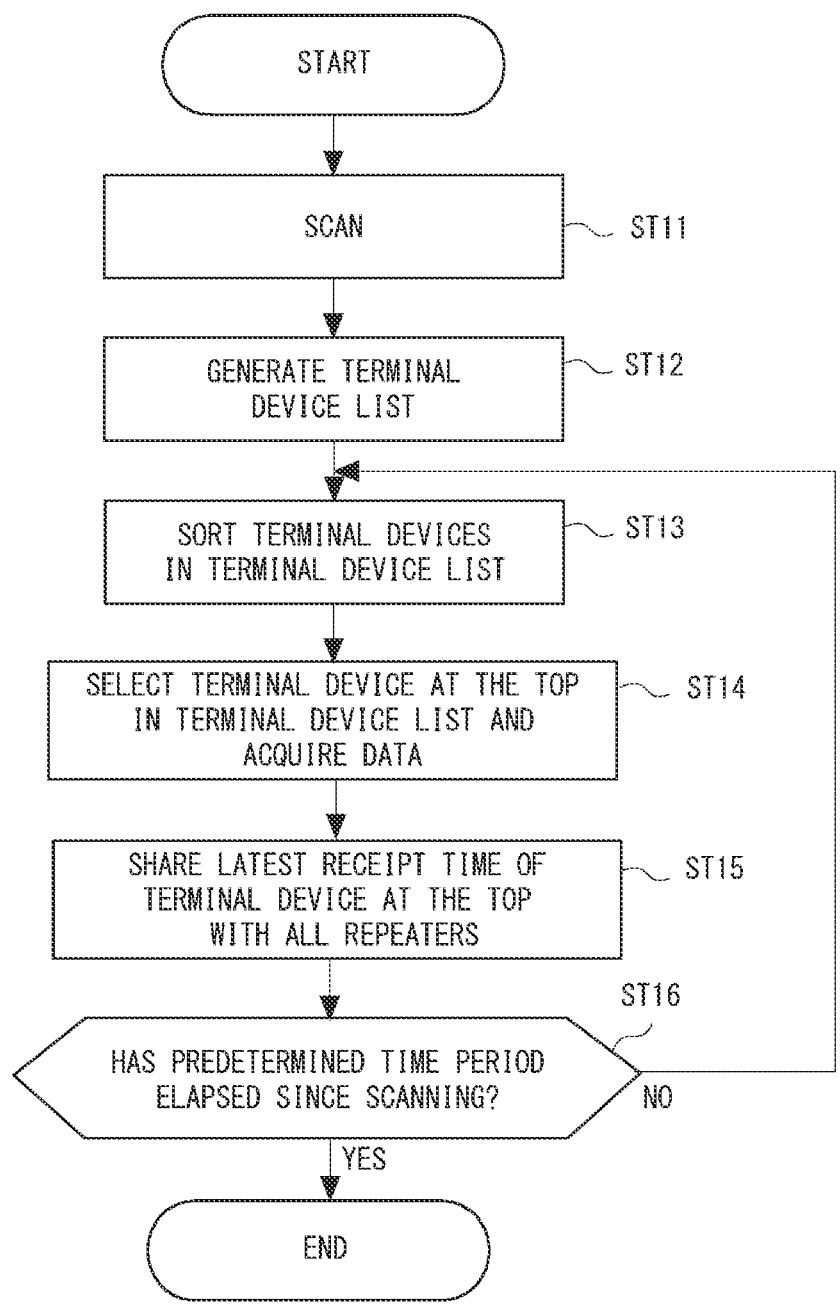
FIG. 5 is a flowchart illustrating an example of an information management method to be executed in the information management system according to the first embodiment.

An example of processing to be executed at the repeater 21 illustrated in FIG. 4 will be schematically described next with reference to FIG. 5. An example of this processing can be also executed at the repeater 22 in a similar manner. Further, an example of this processing is executed at the repeaters 21 and 22 in parallel at the same time within the same period.

First, advertisements of the respective terminal devices are scanned (step ST11). Subsequently, a terminal device list is generated (step ST12). Subsequently, terminal devices within the terminal device list are rearranged (sorted) in chronological order of the latest receipt time (step ST13).

Subsequently, a terminal device arranged at the top of the terminal device list is selected, and detection data is acquired from the selected terminal device (step ST14). Subsequently, the latest receipt time of the terminal device arranged at the top of the terminal device list is shared with all the repeaters 21 and 22 via the server 30 (step ST15).

Subsequently, it is determined whether or not a predetermined time period has elapsed since scanning performed in step ST11 (step ST16). In a case where the predetermined time period has not elapsed since scanning (step ST16: No), the processing returns to step ST13. In other words, the processing from step ST13 to ST15 is repeatedly performed until the predetermined time period elapses after scanning.

On the other hand, in a case where the predetermined time period has elapsed since scanning (step ST16: Yes), the processing is finished. Note that in a case where the predetermined time period has elapsed since scanning, the processing may return to step ST11 again.

As described above, in step ST15, the repeaters 21 and 22 share the latest receipt time of the terminal device arranged at the top. The shared latest receipt time of the terminal device arranged at the top is newer than the latest receipt time of the terminal device originally arranged at the top. Thus, in step ST14 of the processing to be executed at the repeater 22, the terminal device arranged at the top for which the latest receipt time is shared is arranged below the top in the terminal device list of the repeater 22, and thus, the terminal device is not selected, and the detection data is not acquired from the terminal device. The repeater 22 therefore does not acquire detection data from the terminal device from which the repeater 21 has acquired the detection data. Further, this similarly applies to a case where the repeater 21 is replaced with the repeater 22. It is therefore possible to avoid the repeater 22 from performing communication connection with the terminal device from which the repeater 21 has acquired the detection data and acquiring the detection data. In other words, it is possible to prevent degradation of information management efficiency.

(Example of Processing)

Figure 6:
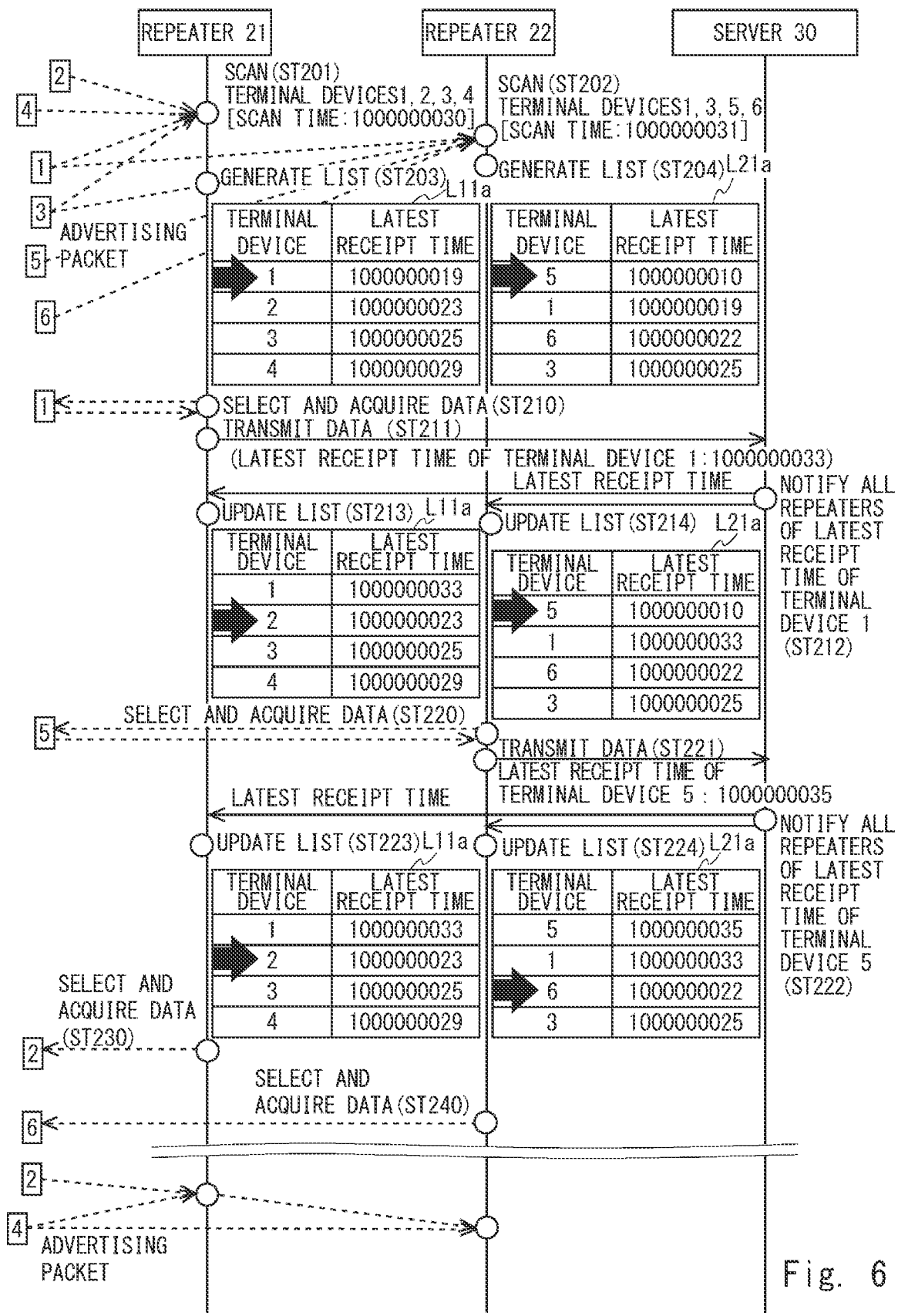
FIG. 6 is sequence illustrating another example of the processing to be executed in the information management system according to the first embodiment.

Another example of the processing to be executed in the information management system 100 will be specifically described next with reference to FIG. 6. FIG. 6 is a view illustrating another example of sequence of the processing to be executed in the information management system 100.

The repeater 21 scans advertisements of the respective terminal devices and records scan time at which the advertisements are scanned (step ST201). Specifically, the repeater 21 receives advertising packets from the respective terminal devices and acquires terminal device IDs from the advertising packets.

The repeater 21, for example, records time at which the advertising packets are received as scan time. In the example illustrated in FIG. 6, the repeater 21 receives advertising packets from the terminal devices 1 to 4 and acquires terminal device IDs from the advertising packets. The repeater 21 records scan time 1000000030.

Subsequently, the repeater 22 scans the advertisements of the respective terminal devices and records scan time at which the advertisements are scanned (step ST202). Specifically, the repeater 22 receives advertising packets from the respective terminal devices and acquires terminal device IDs from the advertising packets. The repeater 21, for example, records time at which the advertising packets are received as scan time. In the example illustrated in FIG. 6, the repeater 22 receives advertising packets from the terminal devices 1, 3, 5 and 6 and acquires terminal device IDs from the advertising packets. The repeater 22 records scan time 1000000031. Note that the processing in step ST201 and step ST202 may be performed in reverse order or may be performed substantially at the same time.

Subsequently, the repeater 21 generates a terminal device list L11a in a similar manner to step ST103 illustrated in FIG. 4 (step ST203). The terminal device list L11a may be generated by rearranging the terminal device IDs acquired by the repeater 21 in step ST201 in chronological order of the latest receipt time.

In a similar manner, the repeater 22 generates a terminal device list L21a in a similar manner to step ST104 illustrated in FIG. 4 (step ST204). The terminal device list L21a may be generated by rearranging the terminal device IDs acquired by the repeater 22 in step ST202 in chronological order of the latest receipt time.

Subsequently, the repeater 21 selects one of the terminal devices 1 to 4 in the terminal device list L11a based on the latest receipt time and acquires detection data from the selected terminal device (step ST210). Specifically, the repeater 21 sequentially compares the latest receipt time of the respective terminal devices with scan time from the terminal device at the top in the terminal device list L11a. In a case where the latest receipt time of the terminal device is newer than the scan time as a result of comparison, the latest receipt time of the next terminal device is compared with the scan time. In a case where the latest receipt time of the terminal device is older than the scan time as a result of comparison, the repeater 21 selects the terminal device and acquires detection data from the terminal device. The repeater 21 performs communication connection with the terminal device and transmits a request for detection data. When the terminal device receives the request for detection data from the repeater 21, the terminal device transmits the detection data held by the terminal device to the repeater 21 and deletes the transmitted detection data.

In an example illustrated in FIG. 6, the terminal device 1 is arranged at the top in the terminal device list L11a. The latest receipt time of the terminal device 1 is older than the scan time. Thus, the repeater 21 selects the terminal device 1 in the terminal device list L11a, performs communication connection with the terminal device 1 and acquires detection data from the terminal device 1.

Subsequently, the repeater 21 transmits the detection data, or the like, acquired in step ST210 to the server 30 in a similar manner to step ST111 (step ST211). In an example illustrated in FIG. 6, the repeater 21 transmits the detection data acquired from the terminal device 1 and latest receipt time 1000000033 of the terminal device 1 to the server 30.

Subsequently, the server 30 notifies all the repeaters of the latest receipt time of the terminal device transmitted in step ST211 in a similar manner to step ST112 (step ST212). In an example illustrated in FIG. 6, the server 30 notifies the repeaters 21 and 22 of the latest receipt time 1000000033 of the terminal device 1.

Subsequently, all the repeaters respectively update the terminal device lists for each repeater (step ST213, ST214). Specifically, all the repeaters update the latest receipt time of the terminal device in the terminal device lists to the latest receipt time of the terminal device notified in step ST212. In an example illustrated in FIG. 6, the repeaters 21 and 22 respectively update the latest receipt time of the terminal device in the terminal device lists L11a and L21a by replacing latest receipt time 1000000019 of the terminal device 1 with the latest receipt time 1000000033 of the terminal device 1 notified in step ST212.

Subsequently, the repeater 22 selects one of the terminal devices 1, 3, 5 and 6 in the terminal device list L21a based on the latest receipt time and acquires detection data from the selected terminal device in a similar manner to step ST210 (step ST220). In an example illustrated in FIG. 6, the terminal device 5 is arranged at the top in the terminal device list L21a. The latest receipt time of the terminal device 5 is older than the scan time. Thus, the repeater 22 selects the terminal device 5 in the terminal device list L21a, performs communication connection with the terminal device 5 and acquires detection data from the terminal device 5.

Subsequently, the repeater 22 transmits the detection data, or the like, acquired in step ST220 to the server 30 in a similar manner to step ST211 (step ST221). In an example illustrated in FIG. 6, the repeater 22 transmits the detection data acquired from the terminal device 5 and the latest receipt time of the terminal device 5 to the server 30.

Subsequently, the server 30 notifies all the repeaters of the latest receipt time transmitted in step ST221 in a similar manner to step ST212 (step ST222). In an example illustrated in FIG. 6, the server 30 notifies the repeaters 21 and 22 of the latest receipt time of the terminal device 5.

Subsequently, all the repeaters respectively update the terminal device lists in a similar manner to step ST213 and ST214 (step ST223, ST224). Specifically, all the repeaters respectively update the latest receipt time of the terminal device in the terminal device lists of the own repeaters to the latest receipt time of the terminal device notified in step ST222. In an example illustrated in FIG. 6, the repeater 22 updates the latest receipt time of the terminal device in the terminal device list L21a by replacing latest receipt time 1000000010 of the terminal device 5 with latest receipt time 1000000035 of the terminal device 5 notified in step ST222. Note that while the repeater 21 also performs updating, or the like, described above in a similar manner, the terminal device list L11a does not originally include the latest receipt time of the terminal device 5, and thus, the terminal device list L11a is not updated, and there is no apparent change between before and after step ST223.

After the processing described above, processing similar to the processing from step ST210 to ST214 or from step ST220 to ST224 may be performed on a terminal device from which detection data has yet been acquired. The processing may return to step ST201 again after the processing in these steps is repeated and processing similar to the processing from step ST110 to ST114 or from step ST120 to ST124 is performed on terminal devices arranged at the bottom in the terminal device lists L11a and L21a.

Specifically, the repeater 21 selects one of the terminal devices 1 to 4 in the terminal device list L11a based on the latest receipt time and acquires detection data from the selected terminal device in a similar manner to step ST210 (step ST230). In an example illustrated in FIG. 6, the terminal devices 1 and 2 are arranged in this order. The repeater 21 compares the latest receipt time of the terminal devices 1 and 2 in the terminal device list L11a with the scan time in this order. The latest receipt time of the terminal device 1 is newer than the scan time as a result of comparison, and thus, the repeater 21 does not select the terminal device 1 in the terminal device list L11a. Thus, the repeater 21 does not acquire detection data from the terminal device 1. The latest receipt time of the terminal device 2 is older than the scan time. Thus, the repeater 21 selects the terminal device 2 in the terminal device list L11a, performs communication connection with the terminal device 2 and acquires detection data from the terminal device 2. Further, the repeater 21 shares the acquired detection data by notifying all the repeaters via the server 30 in a similar manner to step ST211 to ST214.

Subsequently, the repeater 22 selects one of the terminal devices 1, 3, 5 and 6 in the terminal device list L21a based on the latest receipt time and acquires detection data from the selected terminal device in a similar manner to step ST220 (step ST240). In an example illustrated in FIG. 6, the terminal devices 5, 1 and 6 are arranged in this order in the terminal device list L21a. The latest receipt time of the terminal devices 5 and 1 is newer than the scan time, and thus, the repeater 22 does not select the terminal devices 5 and 1 in the terminal device list L11a. The latest receipt time of the terminal device 6 is older than the scan time. Thus, the repeater 22 selects the terminal device 6 in the terminal device list L21a, performs communication connection with the terminal device 6 and acquires detection data from the terminal device 6. Further, the repeater 22 shares the acquired detection data with all the repeaters via the server 30 in a similar manner to step ST221 to ST224.

Subsequently, processing similar to the processing from step ST210 to ST214 or from step ST220 to ST224 is performed on the terminal devices 3 and 4 from which detection data has yet been acquired. Neither the repeater 21 nor the repeater 22 acquires detection data from the terminal device 3 in a similar manner to the terminal device 1. The other of the repeaters 21 and the repeater 22 does not connect to the terminal device 3 from which the detection data has been acquired.

According to an example described above, it is possible to avoid both the repeaters 21 and 22 from performing communication connection with the terminal device 1 which is respectively scanned by the repeaters 21 and 22 and acquiring detection data. It is therefore possible to reduce the possibility of degradation of information management efficiency as the whole information management system 100.

(Example of Processing)

Figure 7:
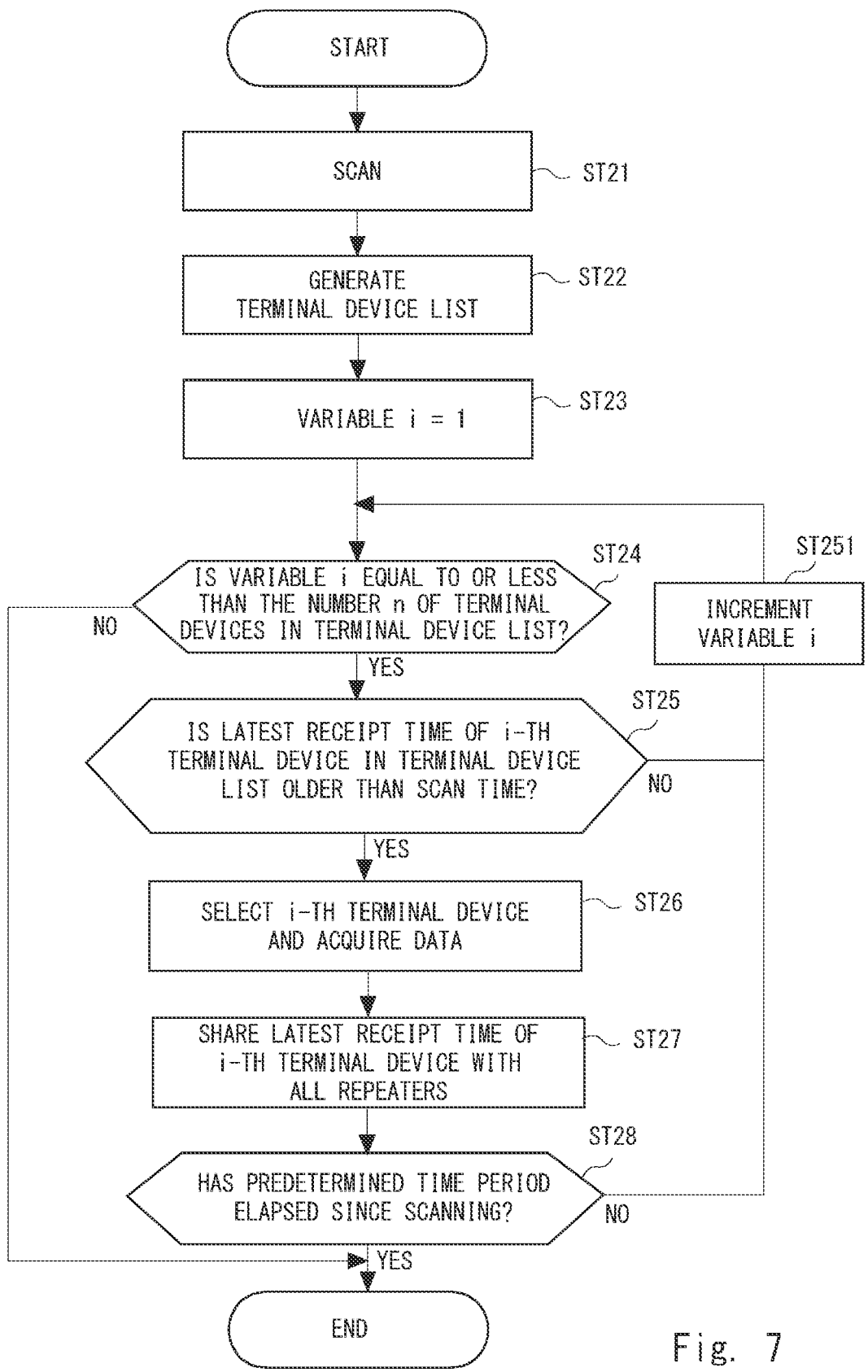
FIG. 7 is a flowchart illustrating another example of the information management method to be executed in the information management system according to the first embodiment.

Another example of the processing to be executed at the repeater 21 illustrated in FIG. 6 will be schematically described next with reference to FIG. 7. The processing in this example can be similarly executed at the repeater 22. Further, the processing in this example is executed at the repeaters 21 and 22 in parallel at the same time within the same period.

First, advertisements of the respective terminal devices are scanned (step ST21). Scan time which is time at which the advertisements are scanned is acquired and stored in the storage device 230. Subsequently, a terminal device list is generated (step ST22).

Subsequently, a variable i is set (step ST23). An initial value of the variable i is 1. The variable i is order of the terminal device from the top in the terminal device list.

It is determined whether the variable i is equal to or less than the number n of the terminal devices in the terminal device list (step ST24). In a case where the variable i exceeds the number n of the terminal devices in the terminal device list (step ST24: No), the processing is finished. Note that in a case where the variable i exceeds the number n of the terminal devices in the terminal device list, the processing may return to step ST21 again.

On the other hand, in a case where the variable i is equal to or less than the number n of the terminal devices in the terminal device list (step ST24: Yes), it is determined whether or not the latest receipt time of the i-th terminal device in the terminal device list is older than the scan time (step ST25).

On the other hand, in a case where the latest receipt time is newer than the scan time (step ST25: No), it is determined that the i-th terminal device is not a communication connection target, the variable i is incremented (step ST251), and the processing returns to step ST24.

In a case where the latest receipt time is older than the scan time (step ST25: Yes), the i-th terminal device in the terminal device list is selected, and detection data is acquired from the selected terminal device (step ST26).

Subsequently, the latest receipt time of the i-th terminal device is shared with all the repeaters 21 and 22 via the server 30 (step ST27).

Subsequently, it is determined whether or not a predetermined time period has elapsed since scanning (step ST28). In a case where the predetermined time period has not elapsed since scanning (step ST28: No), the variable i is incremented (step ST251), and the processing returns to step ST24.

On the other hand, in a case where the predetermined time period has elapsed since scanning (step ST28: Yes), the processing is finished. Note that in a case where the predetermined time period has elapsed since scanning, the processing may return to step ST21 again.

As described above, in step ST27, the repeaters 21 and 22 share the latest receipt time of the i-th terminal device. The shared latest receipt time of the i-th terminal device is newer than the scan time, and thus, in step ST25 of the processing to be executed at the repeater 22, it is determined that the i-th terminal device for which the latest receipt time is shared is not a communication connection target. Thus, the repeater 22 does not acquire detection data from the i-th terminal device from which the repeater 21 has acquired the detection data. Further, this similarly applies to a case where the repeater 21 is replaced with the repeater 22. It is therefore possible to avoid the repeater 22 from performing communication connection with the terminal device from which the repeater 21 has acquired detection data and acquiring the detection data. In other words, it is possible to prevent degradation of information management efficiency.

In the above example, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals. The computer includes various types of apparatuses such as a PC (Personal Computer), a server, a CPU, an MPU, an FPGA (Field-Programmable Gate Array), and an ASIC (Application Specific Integrated Circuit).

Further, as described in the examples of the processing in the information management system in the above-described various embodiments, the present disclosure can take a form of an information management method to be executed in the information management system. An example of this information management method is indicated in FIG. 5 and FIG. 7. Note that other examples are as described in the above-described embodiments. Further, it can be said that the above-described program is a program for causing the information management system to execute such an information management method.

Note that the present disclosure is not limited to the above-described embodiments and can be changed as appropriate within a range not deviating from the scope of the present disclosure. Further, the present disclosure may be implemented by combining the above-described embodiments and an example of the above-described embodiments as appropriate.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An information management system comprising:
   a plurality of terminal devices configured to generate detection data;
   a plurality of repeaters configured to acquire the detection data from at least one of the plurality of terminal devices; and
   a server configured to give and receive data to and from at least one of the plurality of repeaters,
   the plurality of repeaters respectively receiving detection data in advance from at least one of the plurality of terminal devices,
   the plurality of repeaters respectively holding terminal device lists,
   the terminal device lists indicating at least one of the plurality of terminal devices from which the detection data is received in advance and latest receipt time which is time at which the detection data is received in advance,
   the plurality of repeaters being notified of latest receipt time at which one of the plurality of repeaters receives the detection data from one of the plurality of terminal devices, via the server, and
   the plurality of repeaters determining whether or not to acquire detection data from at least one of the plurality of terminal devices from which the detection data is received in advance, in the terminal device lists based on the notified latest receipt time.

2. The information management system according to claim 1,
   wherein in a case where one of the plurality of terminal devices is described in the terminal device lists, the plurality of repeaters update latest receipt time of one of the plurality of terminal devices in the terminal device lists to the notified latest receipt time.

3. The information management system according to claim 2,
   wherein the plurality of repeaters respectively determine to acquire detection data from a terminal device with the oldest latest receipt time among the plurality of terminal devices in the terminal device lists.

4. The information management system according to claim 3,
   wherein the plurality of repeaters specify a terminal device with the oldest latest receipt time by rearranging the plurality of terminal devices in the terminal device lists in chronological order of latest receipt time.

5. The information management system according to claim 2,
   wherein the plurality of repeaters respectively scan an advertisement from at least one of the plurality of terminal devices in advance and hold scan time at which the advertisement is scanned, and
   the plurality of repeaters respectively determine to acquire detection data from a terminal device for which latest receipt time is older than the scan time among the plurality of terminal devices in the terminal device lists.

6. The information management system according to claim 5, wherein the plurality of repeaters respectively compare the latest receipt time of the plurality of terminal devices in the terminal device lists with the scan time, and determine to acquire detection data from a terminal device for which the latest receipt time is older than the scan time among the plurality of terminal devices in the terminal device list.

7. The information management system according to claim 6, wherein the plurality of repeaters determine not to acquire detection data from a terminal device for which the latest receipt time is newer than the scan time among the plurality of terminal devices in the terminal device lists.

8. The information management system according to claim 1, wherein the detection data includes sound recorded by the terminal devices and acceleration applied to the terminal devices.

9. An information management method to be executed in an information management system comprising:

a plurality of terminal devices configured to generate detection data;

a plurality of repeaters configured to acquire the detection data from at least one of the plurality of terminal devices; and a server configured to give and receive data to and from at least one of the plurality of repeaters, the plurality of repeaters receiving detection data in advance from at least one of the plurality of terminal devices, the plurality of repeaters respectively holding terminal device lists, and the terminal device lists indicating at least one of the plurality of terminal devices from which the detection data is received in advance and latest receipt time which is time at which the detection data is received in advance, the information management method comprising:

a step of notifying all of the plurality of repeaters of latest receipt time at which one of the plurality of repeaters receives the detection data from one of the plurality of terminal devices, via the server; and a step of determining whether or not to acquire detection data from one of the plurality of terminal devices in the terminal device lists based on the notified latest receipt time.

10. A non-transitory computer-readable medium storing an information management program for causing a computer which operates as one of a plurality of repeaters in an information management system to execute steps, the information management system comprising:

a plurality of terminal devices configured to generate detection data;

a plurality of repeaters configured to acquire the detection data from at least one of the plurality of terminal devices; and a server configured to give and receive data to and from at least one of the plurality of repeaters, the plurality of repeaters receiving detection data in advance from at least one of the plurality of terminal devices, the plurality of repeaters respectively holding terminal device lists, and the terminal device lists indicating at least one of the plurality of terminal devices from which the detection data is received in advance and latest receipt time which is time at which the detection data is received in advance, the steps comprising:

a step of notifying all of the plurality of repeaters of latest receipt time which is time at which one of the plurality of repeaters receives the detection data from one of the plurality of terminal devices, via the server; and a step of determining whether or not to acquire detection data from one of the plurality of terminal devices in the terminal device lists based on the notified latest receipt time.

* * * * *